United States Patent [19]

Arends et al.

[11] 4,066,342
[45] Jan. 3, 1978

[54] MIRROR MOUNT WITH BEVELED APERTURE FOR OPTICAL SYSTEMS

[75] Inventors: Thomas Clark Arends; Warren Hastings Miller, Jr., both of Palm Bay, Fla.

[73] Assignee: Harris Corporation, Cleveland, Ohio

[21] Appl. No.: 680,394

[22] Filed: Apr. 26, 1976

[51] Int. Cl.² .............................................. G02B 5/08
[52] U.S. Cl. .................................................. 350/288
[58] Field of Search ...................... 350/310, 288, 252; 331/94.5 D, 94.5 C; 248/478, 476

[56] References Cited

U.S. PATENT DOCUMENTS

| 2,441,104 | 5/1948 | Schubert et al. ..................... 350/252 |
| 3,670,263 | 6/1972 | Kantorski et al. ..................... 350/288 |

FOREIGN PATENT DOCUMENTS

| 1,545,056 | 9/1968 | France .................................. 350/310 |
| 881,584 | 5/1953 | Germany ............................... 350/310 |

Primary Examiner—Jon W. Henry
Attorney, Agent, or Firm—Charles C. Krawczyk; Leslie J. Hart

[57] ABSTRACT

A tubular shaped aperture extends through a mounting base and includes two aligned sections of different sizes so that the junction of the two sections provides an abutment. A mirror is positioned within the larger section with the reflective side facing the smaller section and abuts against a ring-shaped spring device therebetween. A plurality of adjustable screws engage the reverse side of the mirror to control the orientation of the mirror relative to the axis of the aperture and to adjust the position of the mirror along the axis.

1 Claim, 8 Drawing Figures

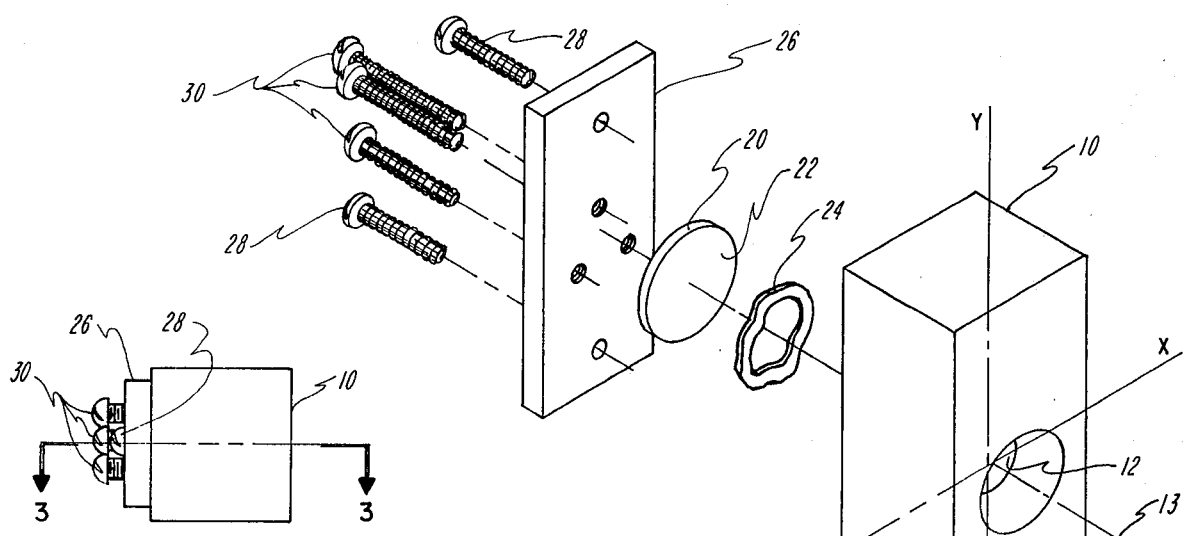
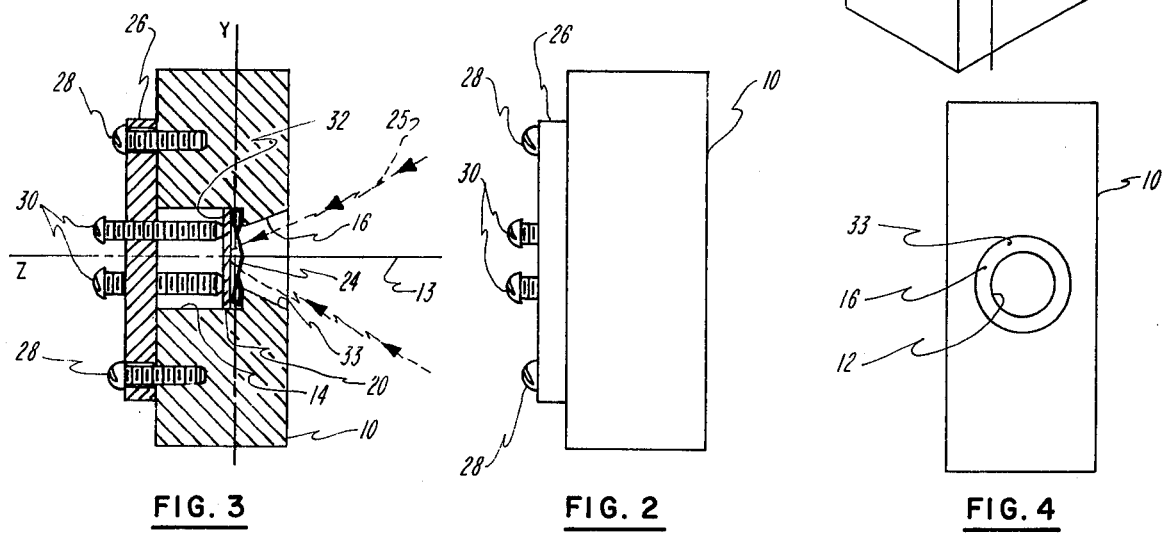
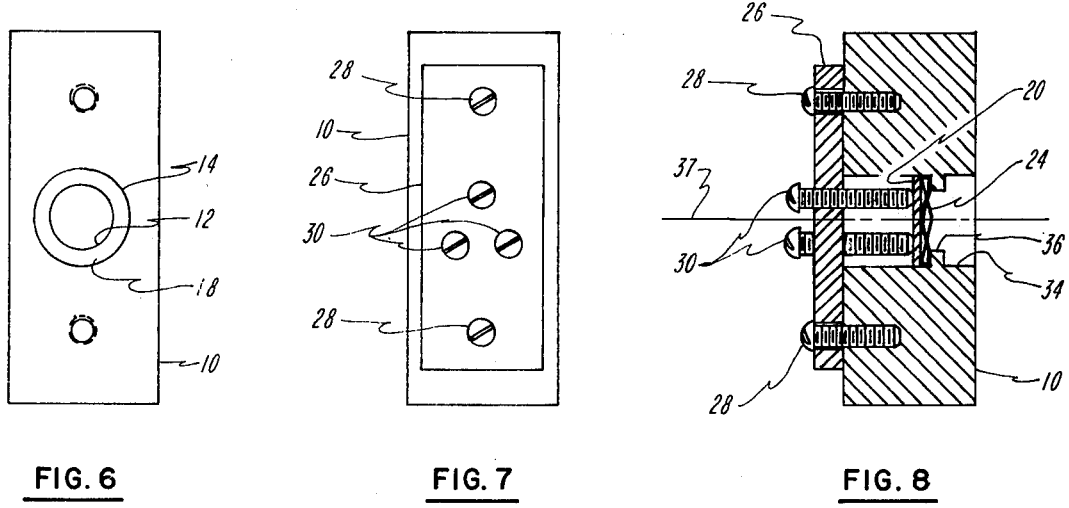

MIRROR MOUNT WITH BEVELED APERTURE FOR OPTICAL SYSTEMS

BACKGROUND

In many optical systems there is a need for the use of mirrors to control the path of beams of radiation. In order to accurately control the path of a beam of radiation, a mirror should be adjustable in translation along the path of the beam to control the displacement of the reflected beam along a preset plane, and be adjustable in a pivotal manner about any axis parallel to the mirror surface to control the deflection. Furthermore, it is desirable that the mirror mount should be relatively inexpensive, be manufactured by standard techniques, and still provide the means for accurately adjusting the mirror so that the path of the beam can be precisely controlled.

It is therefore an object of this invention to provide a new and improved adjustable mirror mount for optical systems.

It is also an object of this invention to provide a new and improved low cost mirror mount that provides for adjustments in translation and pivotal motion.

BRIEF DESCRIPTION OF THE INVENTION

A tubular shaped aperture extends through a base member and is formed with an abutment extending from the walls of the aperture toward the axis of the aperture and that is located between the ends of the aperture. A mirror is placed in the aperture with reflective side facing the abutment. Resilient means are placed between the abutment and the mirror to provide a resilient force therebetween. The resilient means is formed with an opening that is located along an axis of the aperture to provide a free path for radiation to and from a reflective side of the mirror. Adjustment means are provided to control the position of the mirror along the axis of the aperture and for pivoting the mirror relative to the axis.

In accordance with one embodiment of the invention the tubular shaped aperture is formed with two axially aligned sections of different sizes wherein the abutment is formed by the junction of the two sections.

In accordance with a further embodiment of the invention the resilient means is in the form of a ring such as a commercially available wavy washer.

In accordance with still a further feature of the invention the adjustment means includes three adjusting devices, such as screws, arranged in a triangular array, that are adapted to urge against the reverse side of the mirror to control the position of the reflective surface of the mirror relative to the axis of the aperture.

BRIEF DESCRIPTION OF THE FIGURES

FIG. 1 is a perspective exploded view of a mirror mounting arrangement including the invention.

FIG. 2 is a side view of the mirror mounting arrangement of FIG. 1.

FIG. 3 is a sectional side view of the mounting arrangement of FIG. 1 taken along lines 3—3 of FIG. 5.

FIG. 4 is a front view of the mounting arrangement of FIG. 1.

FIG. 5 is a top view of the mounting arrangement of FIG. 1.

FIG. 6 is a rear view of the mounting arrangement of FIG. 1 with the adjustment means removed.

FIG. 7 is a rear view of a mounting arrangement of FIG. 1 including the adjustment means.

FIG. 8 is a sectional side view of the mounting arrangement of FIG. 1 of another embodiment of the invention.

DETAILED DESCRIPTION OF THE EMBODIMENT

The mounting arrangement of the invention includes a generally rectangular shaped base 10 formed with a tubular shaped aperture 12 extending therethrough having an axis 13 (designated as the Z axis). In accordance with the embodiment of FIGS. 1-6, the aperture 12 includes two axially aligned sections 14 and 16 of different sizes, or diameter, and the junction of the two sections forms a lip or abutment 18. A disk shaped mirror 20 is positioned within the larger section 14 with its reflective side 22 facing the smaller section 16. Resilient means, illustrated as a wavy washer 24, is located between the mirror reflective side 22 and the abutment 18 to provide a resilient force therebetween. The wavy washer 24 is a standard commercially available continuous ring-shaped washer made of spring type material and includes a plurality of curves or waves formed along the sides that engage a plurality of curves or waves formed along the sides that engage the mirror 20 and the abutment 18. The wavy washer 24 is usually used in most other cases as a preloading element for bearings. The wavy washer 24 includes an opening therethrough to provide a path for a beam of radiation 25 to and from the reflective side 22 of the mirror. The end 33 of the section 16 of the aperture 12 is beveled to provide a "countersunk" type opening for the beam 25 to allow for a greater angular displacement of the reflected beam. A cover 26 is secured by a pair of screws 28 to the rear side of the base 10. Three adjustment screws 30, arranged in a triangular array, extend through threaded holes in the cover 26 into the aperture section 14 and are adapted to engage the rear side 32 of the mirror 20. The three adjustment screws 30 provide a means for controlling the position of the mirror 20 relative to the axis 13 of the aperture 12. For example, if all three screws 30 are adjusted simultaneously, mirror 20 is moved in translation motion along the axis 13 of the aperture. i.e., in the Z direction as illustrated in FIGS. 1 and 2. On the other hand, if only one screw 30 is adjusted, differentially, the mirror 20 is pivoted about the X and Y axis of FIG. 1. Hence, as can be seen, the mirror mount of the invention is a relatively simple arrangement that can be made by inexpensive machining processes and uses commercially available low cost resilient devices. The base 10 need only be formed by milling or drilling to provide the two sized aperture, or can be formed out of plastic. The wavy washer 24 is a very low cost commerically available item that provides a resilient force at a plurality of locations between the face 22 of the mirror 20 and the abutment 18. The three adjustment screws 30 provide a very simple and low cost means for accurately setting the reflective face 22 of the mirror at a precise location relative to the path of the beam 25 to be reflected. Hence, the mirror mount can be merely secured to the optical chassis approximately the correct position and thereafter adjusted by the use of the screws 30 to the precise location.

Although the mounting arrangement of the invention has been described as including a generally circular tubular shaped aperture having two sections of different diameters, and a disk shaped mirror, it is to be understood, that the aperture and the abutment provided therein, can take various other forms. For example, as illustrated in FIG. 8, the base 10 is formed with a substantially continuous single sized aperture 34 with a ring shaped abutment 36 extending towards the axis 37 of the aperture 34. For purposes of simplifying the explanation of FIG. 8, the components in FIG. 8 that are identical to those of FIGS. 1–7 will have the same reference number. In such arrangement, the reflective side of a mirror 20 faces the abutment 34 with resilient means 24 placed in between. In addition to the foregoing, although the aperture extending through the base 10 has been illustrated as being circular, it is to be understood that the aperture can take other forms such as, for example, square, rectangular, etc., and the shape of the mirror, the abutment, and the resilient means would also be appropriately modified.

What is claimed is:

1. A mirror mounting arrangement comprising:
   a base formed with a tubular shaped aperture extending therethrough, the base being formed with a circular shaped aperture having two sections of different diameter, the sections being substantially aligned along the axis of the aperture;
   abutment means extending from the inner walls of said aperture toward the axis of the aperture to provide a passage of reduced size located along a portion of said aperture;
   a mirror positioned in said aperture with its reflective side located transverse the axis of said aperture and facing said abutment means;
   resilient means comprising a ring shaped wavy washer positioned between said mirror and said abutment means for providing a resilient force therebetween, said washer being formed with an opening extending therethrough to provide a path for radiation to and from said mirror through said aperture,
   adjustment means for urging said mirror against said resilient means adapted to adjust the position of said mirror in a translational direction along the axis of the aperture and in a pivotal direction about the axis, said adjustment means including three screws arranged in a triangular configuration and having ends which directly contact the side of the mirror opposite said reflective side; and
   the section of said aperture in the base opposite to the section into which said mirror is disposed being bevel shaped and having a greater diameter at one end than at the end defined by the abutment means so that the path of radiation for impinging the reflective side of the mirror may form a large angle with respect to the axis of the aperture.

* * * * *